C. F. BURGESS.
DRY BATTERY.
APPLICATION FILED MAY 21, 1917.
1,297,653.
Patented Mar. 18, 1919.
2 SHEETS—SHEET 1.
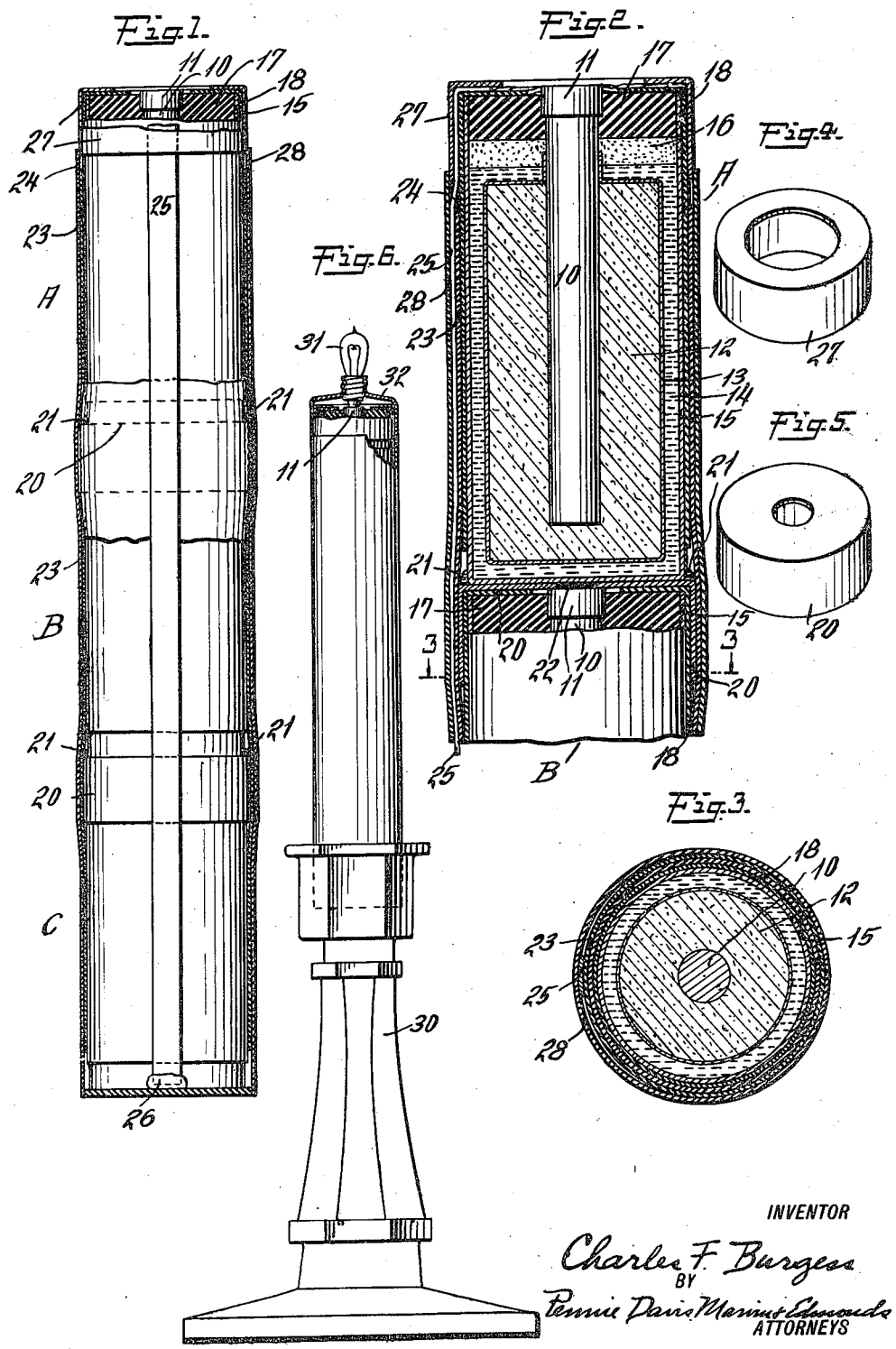
INVENTOR
Charles F. Burgess
BY
Pennie Davis Marvin Edmonds
ATTORNEYS C. F. BURGESS.
DRY BATTERY.
APPLICATION FILED MAY 21, 1917.
1,297,653.
Patented Mar. 18, 1919.
2 SHEETS—SHEET 2.
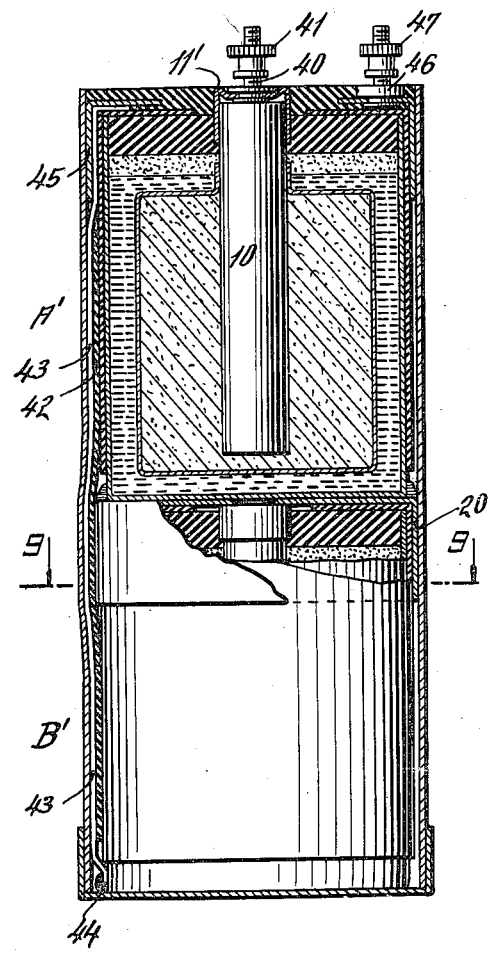
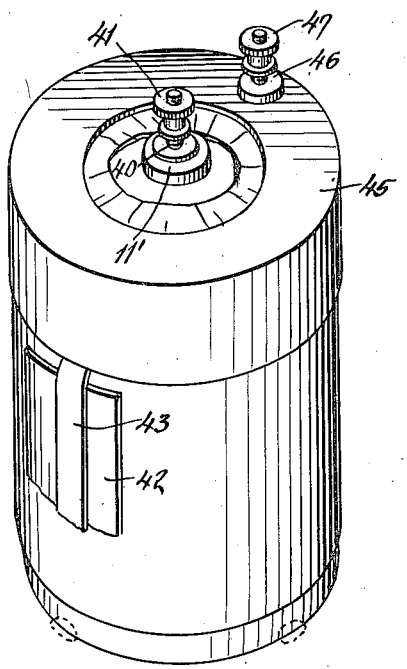
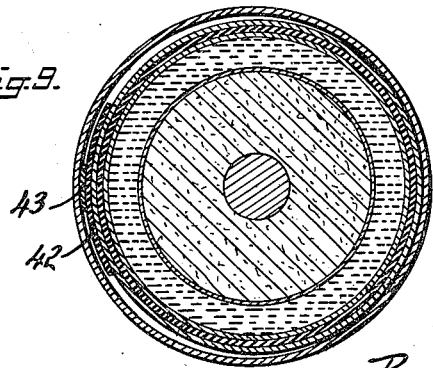
INVENTOR
Charles F. Burgess
BY
Pennie Davis Marvin Edmonds
ATTORNEYS.

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

DRY BATTERY.

1,297,653.  Specification of Letters Patent.  Patented Mar. 18, 1919.

Application filed May 21, 1917. Serial No. 169,868.

*To all whom it may concern:*

Be it known that I, CHARLES F. BURGESS, a citizen of the United States, residing at Madison, in the county of Dane, State of Wisconsin, have invented certain new and useful Improvements in Dry Batteries; and I do hereby declare the following to be a full, clear, and exact description of the invention, such as will enable others skilled in the art to which it appertains to make and use the same.

The present invention relates to dry batteries. In one embodiment, the battery is particularly adapted for use in flashlights and battery hand lamps of a type in which the battery forms the body of the device and the lamp is detachably secured thereto, as distinguished from those devices in which the lamp is attached to a tubular casing within which the batteries are contained. In another embodiment, the battery is suitable for more general use, as in engine ignition, telephone work, and the like.

It is an object of the present invention to produce dry cells of such a construction that a plurality of them may be connected together and be rigidly attached to one another to form a unitary and rigid battery structure which may be used for a hand lamp, or in slightly modified form may be used for any of the other purposes for which dry cells are generally suitable.

It is another object of the invention to form the dry cells so that when they are grouped together in a rigid relation and in series connection both terminals of the battery will lie adjacent one another at one end of the structure, thereby facilitating connection with the lamp or the other current consuming device.

Other features and advantages of the invention will be made clear by a description of certain preferred embodiments thereof as illustrated in the accompanying drawings, in which—

Figure 1 shows an arrangement by which a number of dry cells may be connected end to end in series relation.

Fig. 2 is a sectional elevation through the upper one of the cells and the end portion of the next adjacent cell.

Fig. 3 is a cross-section along the line 3—3 of Fig. 2.

Fig. 4 is a detail view showing the metal cap constituting one terminal of the battery.

Fig. 5 is a detail view showing another metal cap for use in connecting adjacent cells to one another.

Fig. 6 is a view partly in section showing how the battery may be used with an electric lamp.

Fig. 7 is a view principally in section showing a similar arrangement of dry cells suitable for other purposes.

Fig. 8 is a perspective view of the upper cell of Fig. 7; and

Fig. 9 is a cross-section along the line 9—9 of Fig. 7.

Referring to the drawings, in which similar reference characters denote similar parts throughout the several views, the three dry cells constituting the complete battery shown in Fig. 1 are designated A, B and C. Considering first the upper cell A, as shown in detail in Fig. 2, 10 represents a carbon rod forming one pole of the cell. Upon this rod is the usual metallic cap 11. The carbon rod is surrounded by a core of depolarizing mixture 12 held in place by a bibulous envelop 13 which may be constructed of cloth or other suitable material. Outside of the depolarizing mixture is the electrolytic paste 14 held in a zinc cup 15 which serves as the positive electrode of the cell and also as a container for the elements referred to above. Above the electrolytic paste is an airspace or porous separator 16 to receive any gases that may be developed in the cell. Above the separator is the usual pitch seal 17, the top of which may be substantially flush with the edge of the zinc electrode 15. The metal cap 11 projects slightly above the pitch. The foregoing details may be varied in many ways.

Around the zinc cup 15 is a wrapping 18 of paper or equivalent insulating material which is carried over the top of the pitch seal and extends as near the metallic cap 11 as may be desired. The wrapping 18 does not extend quite to the bottom of the zinc cup so that the latter is exposed for attachment to the second cell B, which like the cell A, is provided with a carbon electrode 10 having a metallic cap 11 and the other elements including the zinc cup 15, the pitch seal 17 and the wrapper of paper 18. The second cell is provided with a metal cap 20 (Fig. 5) fitting tightly over the upper paper-wrapped end of the cell and extending inwardly over the top of its metallic cap 11. This metal cap can thus form an electrical connection between the zinc electrode of the upper cell and the carbon electrode of the second cell, but in order to insure more perfect conductivity and particularly to secure a rigid connection between the two, they may be connected by solder as indicated at a plurality of points 21, and solder may also be used at the end of the carbon electrode as indicated at 22 to connect cap 11 with cap 20.

The third cell C is of a construction similar to the cell B and these two cells are soldered together in the same manner as are cells A and B.

The three cells thus rigidly connected together are next wrapped with paper or with impregnated cloth or other insulating material 23. The upper edge of this material terminates a short distance below the upper end of cell A, as shown at the point 24. A conducting strip 25 is laid along the wrapping 23 and bent at the point 24 to fit closely against the paper wrapping 18 near the upper end of cell A. The lower end of the conducting strip is bent in and soldered to the exposed portion of the zinc cup 15 of cell C as shown at 26 (Fig. 1). A metallic collar 27 (Fig. 4) is then placed over the upper end of cell A and binds firmly against the end of conducting strip 25 making electrical connection therewith. This collar 27 is provided with a central aperture somewhat larger than the metallic cap 11 which it surrounds. The battery thus built up is then wrapped with an outer covering 28 of any desired material which, since it forms the external surface of the battery, may be water-proofed and may be given a finished appearance or may carry printing or any ornamental designs. This wrapping may be pasted or glued in position and preferably leaves the greater part of collar 27 exposed. More or less than three cells can thus be connected in rigid relation and in series connection, as desired.

In Fig. 6 the battery is shown inserted in a standard 30 which may be of glass or wood and the entire construction is arranged to simulate a candle stick. A lamp 31 is screwed into a metallic socket 32 which fits over the end of the cell A and thus is in electrical connection with the collar 27 which forms one terminal of the battery. The inner terminal of the lamp is in contact with the metallic cap 11 which constitutes the other pole of the battery. As shown in the simple construction of Fig. 6, the lamp 31 may be lighted or extinguished by screwing it into or out of the socket 32 or by sliding the socket on collar 27 until the inner lamp terminal touches or fails to touch cap 11.

The battery construction described above is also adapted for use in other forms of hand lamps where the rigid relation of the cells and their series connection are of importance.

In many cases, however, dry cells should be provided with circuit terminals to which wires may be connected and Figs. 7, 8 and 9 show an embodiment of the present invention in a battery of that construction. In these figures the upper cell A' is provided with a carbon rod 10, but the brass cap 11' is formed with a central aperture within which is set a binding post 40 provided with a clamping nut 41. Other essential elements of this cell are the same as in the cells described above and the same is true of the second cell B' which is provided with a cap 20 adapted to be soldered to the zinc electrode of cell A'. After the two cells have been connected together a strip of insulating material 42 is laid along the side of the cells and on top of this is a conducting strip 43 which corresponds to the strip 25 of Fig. 2, being connected to the zinc electrode of cell B' at the point 44. A collar 45 is forced over the upper end of cell A' with a tight fit and is in electrical contact with the strip 43. A binding post 46 is connected to the top of collar 45 and is provided with a nut 47 beneath which a wire may be clamped. The battery is inclosed in a pasteboard carton or the like, and the top of the cell A' should preferably be covered with a layer of pitch or other hard insulating material in order to protect the conducting elements at the top of the cell and to leave only the binding posts exposed.

The arrangement shown in Fig. 6 is merely illustrative of the many forms in which batteries of this invention may be constructed.

It will be understood that various changes may be made in the details of construction of the cells and in the form and arrangement of their connecting conductors without departing from the principle of the invention as defined by the appended claims.

I claim:

1. A battery comprising a plurality of dry cells, one of which carries a metal collar insulated from both its zinc and its carbon elements, and another of which has a metal cap slipped over and insulated from its zinc element but connected to its carbon element, said cells being connected in series with the zinc element of one cell electrically connected to the metal cap of an adjacent cell and the zinc element of the last cell electrically connected with said collar; substantially as described.

2. A battery comprising a plurality of dry cells, one of which carries a conducting member insulated from both the positive and negative elements of the cell and another of which has a conducting member attached to but insulated from its positive element and connected to its negative element, said cells being connected in series with the positive element of one electrically connected to the conducting member of an adjacent cell that is connected to the negative element of said cell, and the positive element of the last cell electrically connected with said first named conducting member; substantially as described.

3. A battery comprising a plurality of dry cells, one of which carries a metal collar insulated from both its zinc and its carbon elements and another of which has a metal cap fitting over and insulated from its zinc element but connected to its carbon element, said cells being joined in rigid relation and in series connection with the zinc element of one cell in contact with and soldered to the metal cap of the next adjacent cell and the zinc element of the last cell electrically connected with the said collar; substantially as described.

4. A battery comprising, in combination, a plurality of dry cells, conducting means connecting said cells end on end in rigid relation and in series connection, an insulating casing for said rigidly connected cells, a pair of conductors at one end of the structure so formed, one of said conductors being in the form of a collar, and both being rigidly mounted and connected as terminals for said series of cells and a pitch seal about said conductors; substantially as described.

5. A battery comprising, in combination, a plurality of dry cells, means connecting said cells end to end in series relation, a collar rigidly attached to and encircling the topmost cell and insulated therefrom, a conducting strip leading directly from the lowermost cell to said collar, and an insulating covering for said cells and said conductor; substantially as described.

6. A battery comprising, in combination, a plurality of dry cells, means rigidly connecting said cells end to end in series relation, a collar permanently attached to the topmost cell and insulated therefrom, a conductor leading from the lowermost cell to said collar, and an insulating covering for said cells and said conductor; substantially as described.

7. A battery comprising a carton tube of insulating material, a conductor extending longitudinally of said tube through the insulating material thereof and having end parts projecting from the tube, a plurality of battery cells in the carton tube in end to end relation with the carbon of one cell in electrical connection with the zinc of the cell above it and with the lower part of the zinc of the bottom cell in contact with the adjacent lower projecting end part of said conductor, a conducting member permanently attached to the upper end of the top-most cell and electrically connected to the upper projecting end part of the conductor, but insulated from said cell; substantially as described.

8. A battery comprising a carton tube of insulating material, a conductor extending longitudinally of said tube through the insulating material thereof and having extended end parts projecting inwardly from the tube, a plurality of battery cells in the carton tube in end to end relation with the carton of one cell in electrical connection with the zinc of the cell above it and with the lower part of the zinc of the bottom cell in contact with the adjacent lower inwardly projecting end part of said conductor, the upper inwardly projecting end part of said conductor extending partly over the top of the topmost cell, and a conducting member on the upper part of the topmost cell and electrically connected to the upper inwardly projecting end part of said conductor to form one terminal of the battery.

9. A battery comprising a carton tube of insulating material, a conductor extending longitudinally of said tube through the insulating material thereof and having extended end parts projecting inwardly from the tube, a plurality of battery cells in the carton tube in end to end relation with the carton of one cell in electrical connection with the zinc of the cell above it and with the lower part of the zinc of the bottom cell in contact with the adjacent lower inwardly projecting end part of said conductor, the upper inwardly projecting end part of said conductor extending partly over the top of the topmost cell, and a collar of conducting material surrounding the upper end of the topmost cell, but insuated therefrom and having an inwardly extending portion which together with the side of said collar contacts with the upper end of said conductor whereby said collar forms one terminal of the battery.

In testimony whereof I affix my signature.

CHARLES F. BURGESS.